(12) United States Patent
Yu (10) Patent No.: US 9,058,204 B2
(45) Date of Patent: Jun. 16, 2015

(54) CONTROL METHOD AND CONTROL DEVICE FOR RELEASING MEMORY

(75) Inventor: Xin Yu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 233 days.

(21) Appl. No.: 13/259,674

(22) PCT Filed: Nov. 5, 2010

(86) PCT No.: PCT/CN2010/078456
§ 371 (c)(1),
(2), (4) Date: Aug. 6, 2012

(87) PCT Pub. No.: WO2011/153786
PCT Pub. Date: Dec. 15, 2011

(65) Prior Publication Data
US 2013/0074082 A1    Mar. 21, 2013

(30) Foreign Application Priority Data
Jun. 9, 2010  (CN) .......................... 2010 1 0199201

(51) Int. Cl.
  *G06F 9/46*   (2006.01)
  *G06F 9/48*   (2006.01)
  *G06F 11/34*  (2006.01)
  *G06F 9/50*   (2006.01)

(52) U.S. Cl.
  CPC ............ *G06F 9/485* (2013.01); *G06F 11/3466* (2013.01); *G06F 9/5022* (2013.01); *G06F 9/5016* (2013.01)

(58) Field of Classification Search
  CPC . G06F 9/4881; G06F 9/4843; G06F 11/3466; G06F 11/3409; G06F 11/3419; G06F 9/485; G06F 9/5016; G06F 9/5022
  See application file for complete search history.

(56) References Cited

U.S. PATENT DOCUMENTS

| | | | | |
|---|---|---|---|---|
| 6,134,313 | A  * | 10/2000 | Dorfman et al. | 379/201.01 |
| 6,298,422 | B1 * | 10/2001 | Spilo et al. | 711/154 |
| 7,636,918 | B2 * | 12/2009 | Kadashevich | 718/105 |
| 8,533,674 | B2 * | 9/2013 | Abrams et al. | 717/120 |
| 8,578,503 | B2 * | 11/2013 | Kim et al. | 726/26 |
| 2005/0273756 | A1 * | 12/2005 | Zhou | 717/100 |

(Continued)

FOREIGN PATENT DOCUMENTS

| | | |
|---|---|---|
| CN | 101316402 A | 12/2008 |
| CN | 101408861 A | 4/2009 |
| CN | 101499022 A | 8/2009 |

(Continued)

OTHER PUBLICATIONS

International Search Report dated Mar. 17, 2011, issued in corresponding International Application No. PCT/CN2010/078456.

(Continued)

*Primary Examiner* — Van Nguyen
(74) *Attorney, Agent, or Firm* — Scully, Scott, Murphy & Presser, P.C.

(57) ABSTRACT

A control method and a control device for releasing memory are provided. The method implements: obtaining information of current running programs in a terminal device; checking programs whose running states are idle in the current running programs according to the obtained information; closing programs whose running states are idle and releasing corresponding memory.

15 Claims, 6 Drawing Sheets

(56) References Cited

U.S. PATENT DOCUMENTS

2006/0225107 A1* 10/2006 Seetharaman et al. ........ 725/100
2009/0172683 A1* 7/2009 Lin et al. ...................... 718/103

FOREIGN PATENT DOCUMENTS

CN 101673216 A 3/2010
CN 101859261 A 10/2010

OTHER PUBLICATIONS

Supplementary European Search Report issued in European Application No. EP 10 85 2777 dated Jul. 3, 2013.

Johnson, S., "unintentional killing of processes" (2003) retrieved from http://www.nntp.perl.org/group/perl.beginners/2003/04/msg45609.html.

"Kill Idle Process using script !!!" The UNIX and Linux Fomus (http://www.unix.com/index.php), (2009) retrieved from http://www.unix.com/aix/124015-kill-idle-process-using-script-printfriendly.html.

Hildenbrand, J., How to properly set up and use a task killer (Oh, yes, I went there!), Android Central—How to, (2010) retrieved from http://www.androidcentral.com/how-properly-set-and-use-task-killer-oh-yes-i-went-there.

Schmidt, J., et al., "CENTURION—An Idle Process Terminator" (2006) retrieved from http://web.archive.org/web/20060930171019/http://www-ad.final.gov/controls/rd/controls_software_doc/srn009.htm.

Golvach, M., "Idle Process Time on Linux and Unix: How to Find It Again" (2009) retrieved from http://lunuxshellaccount.blogspot.nl/2009/03/idle-process-time-on-linux-and-unix-how.html.

* cited by examiner

| program names / Program states | Running states | Starting time of running states |
|---|---|---|
| Address book | Background suspension | 09:10 |
| Short message | Background suspension | 09:16 |
| Game | Foreground operation | 09:25 |
| player | Background suspension | 09:20 |

CONTROL METHOD AND CONTROL DEVICE FOR RELEASING MEMORY

FIELD OF THE INVENTION

The present invention relates to the technical field of terminal device program management, and in particular to a control method and a control device for releasing memory.

BACKGROUND OF THE INVENTION

With the expanding capacity of the built-in memories of terminal devices such as mobile phone and Personal Digital Assistant (PDA), etc and the increasingly advanced functions of operation devices, there are more and more applications that can be developed and installed in the terminal devices, and the functions of the terminal devices are becoming richer and richer.

There are two kinds of programs running in the terminal devices: one is referred to as essential programs which are used for initiating to maintain the normal operations and the basic functions of the terminal devices, and the essential programs cannot be randomly closed or suspended; and the other is referred to as function programs for realizing some specific application functions, which can be initiated with the initiation of such specific application functions and closed with the closing of such specific application functions, and contain the programs such as photographing, Short Message Service(SMS) and players, etc. Among the function programs, a part of them may be completely closed and then may not occupy the memory after their functions have been closed, while the rest of them may run in the background and still occupy the memory after their functions have been closed. For example, a function that is widely used in mobile phones is to make the call that was made the last time by pressing the dial key twice consecutively, whose essence is that pressing the dial key the first time is to open the "outgoing calls" in the "call history" and further pressing the dial key the second time is to make the call that was made the last time. Then the mobile phones may be switched to a calling interface, and may return to the standby interface after the call is over. After the call is over, users may watch a situation that the call has been over and the mobile phones are in standby mode, with no programs running. However, the program corresponding to the "call history" may have turned to run in the background, and has not been closed completely with still occupying the memory.

If more such similar function programs are running, more memory will be occupied, then there will be less space for running other programs, the power consumption will be higher, and a user may experience a slow response speed of his mobile phone, a long period of initiating a new program and a short standby period of his battery, which resulting in a poor user experience.

Running a program will occupy the memory space of a device. Obviously, more memory will be occupied if more applications are running in a terminal device. However, the memory space in a device is limited, and cannot be expanded to no end with the increasing number of the applications.

SUMMARY OF THE INVENTION

A control method and a control device for releasing memory are provided by the present invention, which are used for saving the memory resources of terminal devices.

According to one aspect of the present invention, a control method for releasing memory is provided, comprising: obtaining information of current running programs in a terminal device; checking programs whose running states are idle in the current running programs according to the obtained information; and closing the programs whose running states are idle and releasing corresponding memory.

According to another aspect of the present invention, a control device for releasing memory is provided, comprising: a program list acquiring module, a program state checking module and an idle program closing module, wherein the program list acquiring module is configured to obtain information of current running programs in a terminal device; the program state checking module is configured to check programs whose running states are idle in the current running programs according to the obtained information; and the idle program closing module is configured to close the programs whose running states are idle and release corresponding memory.

In the present invention, programs whose running states are idle in the terminal device are checked, prompt information of whether to close the idle programs is sent, and the corresponding programs are closed according to the response result of the prompt information. Thus, according to the present invention, idle programs can be found quickly and then closed to release corresponding memory space and save the memory resource of the terminal device and then improve user experience.

DETAILED DESCRIPTION OF THE INVENTION

To solve the problem of wasting memory resources in terminal devices, a control method for releasing memory is provided by the embodiment of the present invention. In this method, programs whose running states are idle in a terminal device are checked, prompt information of whether to close idle programs are sent, corresponding programs are closed according to response result of the prompt information, and corresponding memory is released.

Figure 1:
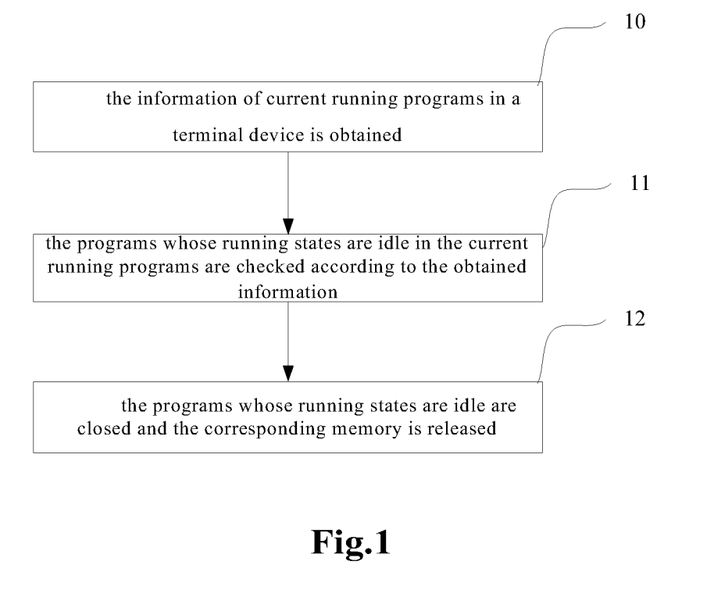
FIG. 1 is a schematic diagram of a flow of a method for closing terminal programs according to one embodiment of the present invention.

Referring to FIG. 1, the control method for releasing memory provided by the embodiment of the present invention comprises the steps as follows.

Step 10: information of current running programs in a terminal device is obtained.

Step 11: obtained programs whose running states are idle in the current running programs are checked according to the obtained information.

Step 12: the programs whose running states are idle are closed and corresponding memory is released.

In addition, after the step 11 and before the step 12, the method further comprises a step of sending prompt information of whether to close the programs whose running states are idle, so that in the step 12 the corresponding programs can be closed according to the obtained response result of the prompt information and the corresponding memory can be released.

Described as follow are two embodiments of this method.

Embodiment 1

Figure 2:
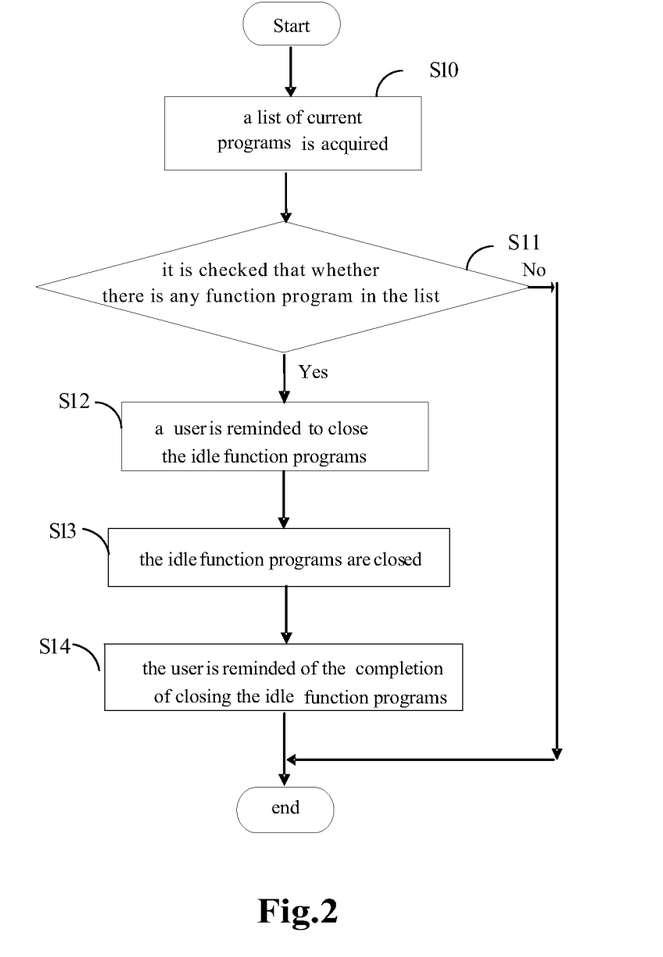
FIG. 2 is a schematic diagram of a flow of a method for closing terminal programs according to Embodiment 1 of the present invention.

As shown in FIG. 2, this embodiment comprises the steps as follows.

Step S10, according to a preset acquiring period, a list containing information of all current running programs in a terminal device is acquired, wherein the information of the programs contains identification information of the programs, space magnitude of the programs in the memory, and etc.

Step S11, according to a preset checking period, it is checked that whether there is any function program whose state is idle in the list acquired in step S10. If there is, the idle function program is added into a list of idle programs to be closed and turn to the step S12; and if there is not, this operation is ended.

Step S12, when the list of idle programs to be closed is not empty, a user is reminded that there exist idle function programs that can be closed by means of a picture and/or ring and names of the idle function programs in the list of idle programs to be closed are displayed.

According to the prompt information, the user decides to close all or part of the idle function programs. If the user does not make any response operation to the prompt information within a designated period, this checking operation will be ended.

Step S13, according to the response result of the prompt information by the user, corresponding idle function programs are completely closed and corresponding memory space is released. The closed programs are deleted from the list and the list is updated.

Step S14, the user is reminded that this operation has been completed.

In this method, if it is detected that a new function program is activated, the program is added into the list of running programs.

Figure 3:
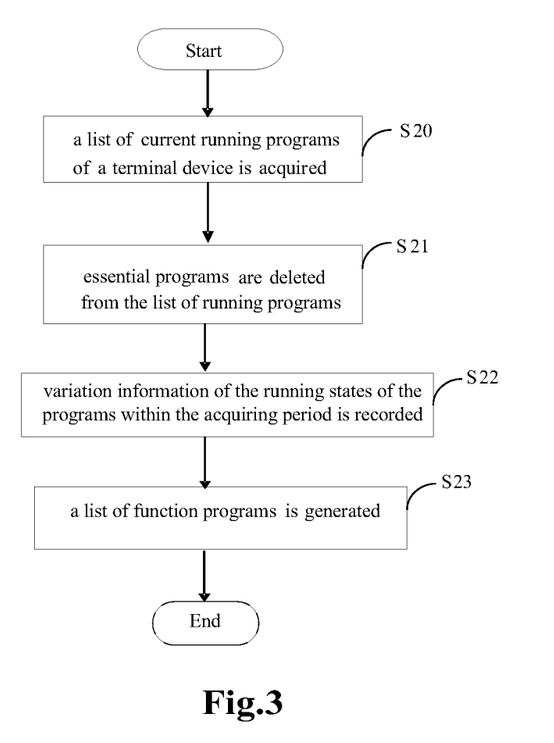
FIG. 3 is a schematic diagram of a flow of acquiring a program list according to Embodiment 1 of the present invention.

As shown in FIG. 3, the process of the step S10 comprises the steps as follows.

Step S20, when the acquiring period L1 is due, a list containing information of all current running programs in a terminal device is acquired, wherein the list is a list of running programs, and all programs comprise essential programs and function programs.

The essential programs are the programs that are initiated to maintain the normal operation of the terminal device and the normal use of basic functions, and the essential programs cannot be randomly closed or suspended. The function programs are the programs for realizing some specific application functions, which can be initiated with the initiation of such specific application functions and closed with the closing of such specific application functions.

The list is first established after the terminal device is started up and serves as basis of each subsequent establishment, wherein the list records the information related to the running states of the programs.

The acquiring period can be set by a user or a manufacturer.

Step S21, the essential programs are removed from the acquired list of running programs and only the function programs are kept.

Step S22, the running states of the function programs in the list of running programs and the time information of turning the function programs to the running states are recorded.

In this method, when the acquiring period L1 is due and after the list containing information of all current running programs in the terminal device has been acquired, it is also necessary to check if there is any new function program that is activated while is not recorded in the list of current running programs in the terminal device. If there is, the information of the function program is added into the list of current running programs to ensure what is recorded in the list of current running programs is the latest information of the current running programs in the terminal device. When a checking period L2 is due, the function programs whose running states are idle in the list of current running programs are checked. The acquiring period should be shorter than the checking period, to ensure acquiring the latest list of current running programs when the checking period is due.

Step S23, a list containing the information of function programs in the list of running programs is generated, which is a list of function programs.

The running states of the function programs comprise: background suspension, idle and foreground running.

In the step S10, the essential programs are removed and only function programs are kept, which can reduce the work load of maintaining the program list and checking the programs. It is noted that this step is not an indispensable step.

Figure 4:
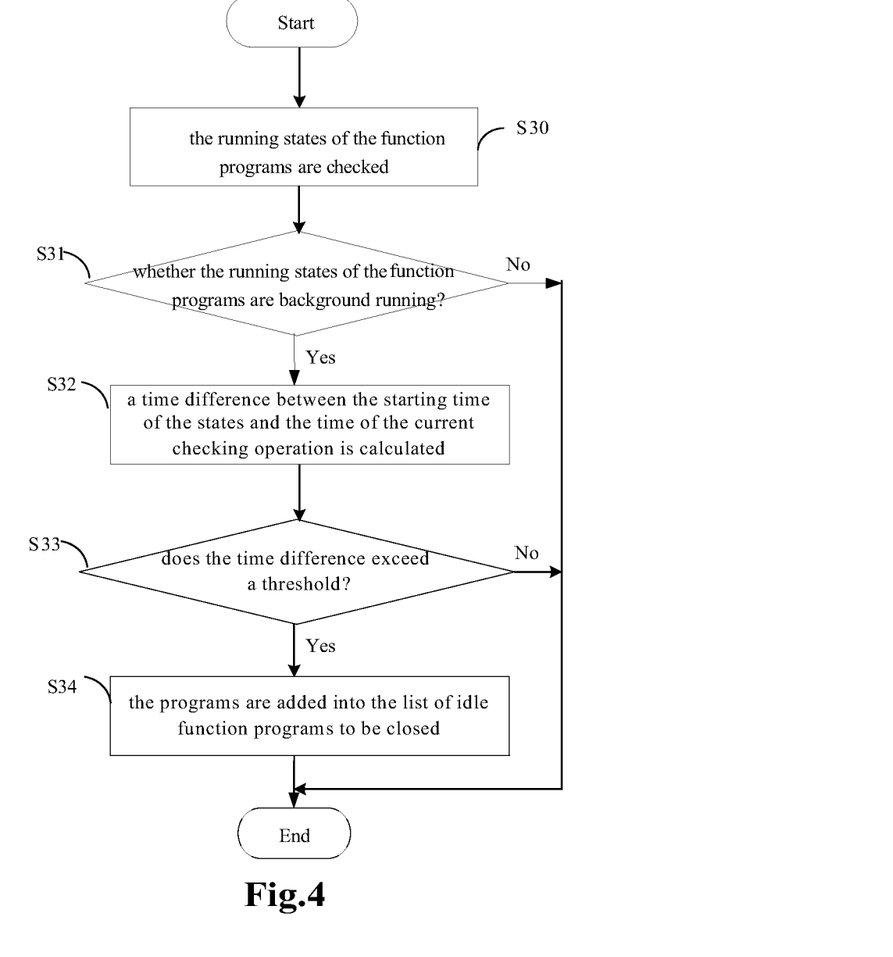
FIG. 4 is a schematic diagram of a flow of checking program states according to Embodiment 1 of the present invention.

FIG. 4 shows the process of the step S11, which comprises the steps as follows.

Figure 5:
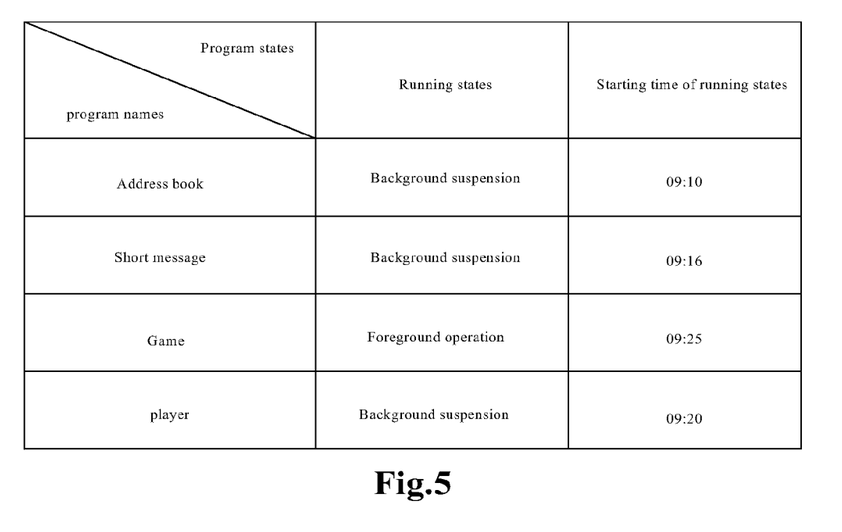
FIG. 5 is a schematic diagram of a list form of function programs according to one embodiment of the present invention.

Step S30, when the checking period L2 is due, the running states of the function programs in the list of function programs are checked, and an example of the list of the function programs is shown in FIG. 5.

Step S31, it is judged that whether the current running states of the function programs are background suspension. If so, turn to the step S32; otherwise this operation is ended.

Step S32, a time difference between the time of turning the function programs to the background suspension state and a current time is calculated, wherein the time difference serves as a duration period $\Delta T$ of the states.

Step S33, the obtained duration period $\Delta T$ is compared with a preset duration period threshold T. If the duration period $\Delta T$ is greater than or equal to the duration period threshold T, turn to the step S34, otherwise this operation is ended.

Step S34, the running states of the function programs are set as idle states, and the information of the function programs is added to the list of idle programs to be closed.

Embodiment 2

Step S10, according to a preset acquiring period, a list containing information of all current running programs in a terminal device is acquired; wherein the information of the programs contains identification information of the programs, space magnitude of the programs in the memory, and etc.

Step S11, according to a preset checking period, it is checked that whether there is any function program whose running state is idle in the list acquired in step S10. If there is, turn to the step S12; and if there is not, this operation is ended.

Step S12, a user is reminded that there exist idle function programs that can be closed by means of a picture and/or ring and names of the function programs whose running states are idle in the list are displayed.

According to the prompt information, the user decides to close all or part of the idle function programs. If the user does not make any response operation to the prompt information within a designated period, this checking operation will be ended.

Step S13, according to the response result of the prompt information by the user, corresponding idle function programs are completely closed and corresponding memory space is released.

Step S14, the user is reminded that this operation has been completed.

The step S10 comprises the steps as follows.

Step S20, when the acquiring period L1 is due, a list containing information of all current running programs in a terminal device is acquired, wherein the list is a list of running programs; and all programs comprise essential programs and function programs.

Step S21, the essential programs are removed from the acquired list of running programs and only the function programs are kept.

Step S22, the running states of the function programs in the list of running programs and the time information of turning the function programs to the running states are recorded.

In this method, when the acquiring period L1 is due and after the list containing information of all current running programs in the terminal device has been acquired, it is also necessary to check if there is any new function program that is activated while is not recorded in the list of current running programs in the terminal device. If there is, the information of the function program is added into the list of current running programs to ensure what is recorded in the list of current running programs is the latest information of the current running programs in the terminal device. When a checking period L2 is due, the function programs whose running states are idle in the list of current running programs are checked. The acquiring period should be shorter than the checking period, to ensure acquiring the latest list of current running programs when the checking period is due.

Step S23, a list containing the information of function programs in the list of running programs is generated, wherein the list is a list of function programs.

The step S11 comprises the steps as follows.

Step S30, when the checking period L2 is due, the running states of the function programs in the list of function programs are checked.

Step S31, it is judged that whether the current running states of the function programs are background suspension. If so, turn to the step S32; otherwise this operation is ended.

Step S32, the time difference between the time of turning the function programs to the background suspension state and a current time is calculated, which serves as a duration period $\Delta T$ of the states.

Step S33, the obtained duration period $\Delta T$ is compared with a preset duration period threshold T. If the duration period $\Delta T$ is greater than or equal to the duration period threshold T, turn to the step S34, otherwise this operation is ended.

Step S34, the running states of the function programs are set as idle states in the list of running programs.

Figure 6:
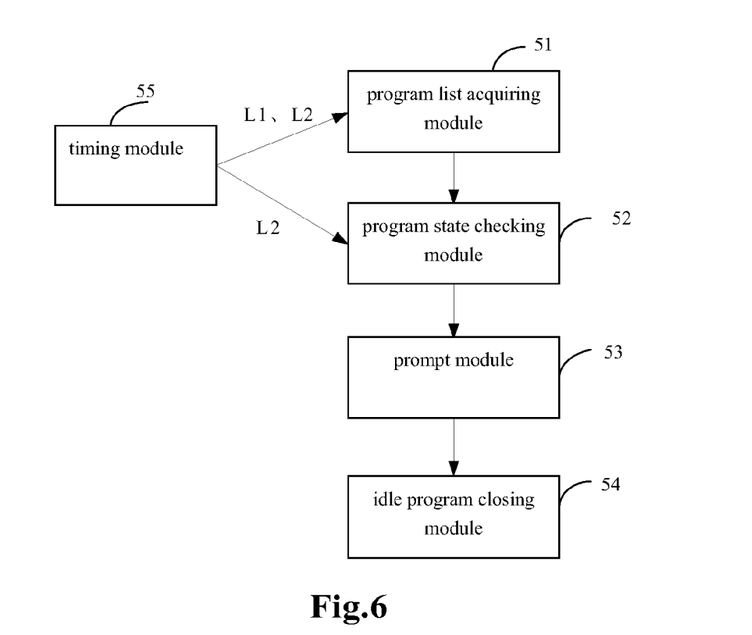
FIG. 6 is a schematic structural diagram of a terminal device according to one embodiment of the present invention.

As shown in FIG. 6, a control device (which can be a terminal device) for releasing memory is also provided by an embodiment of the present invention, and the device comprises: a program list acquiring module 51, a program state checking module 52, a prompt module 53 and an idle program closing module 54. The program list acquiring module 51 is connected with the program state checking module 52, the program state checking module 52 is connected with the prompt module 53, and the prompt module 53 is connected with the idle program closing module 54, wherein, the program list acquiring module 51 is configured to obtain a list containing information of current running programs in a terminal device;

the program state checking module 52 is configured to check programs whose running states are idle in the current running programs according to the list of information obtained by the program list acquiring module 51;

the prompt module 53 is configured to send prompt information of whether to close the programs whose running states are idle; and the idle program closing module 54 is configured to close corresponding programs according to the obtained response result of the prompt information and release corresponding memory.

The device further comprises a timing module 55 which is connected with the program list acquiring module 51 and the program state checking module 52.

The timing module 55 is configured to generate an acquiring period and a checking period.

The program list acquiring module 51 is configured to acquire the list containing information of all current running programs in the terminal device according to the acquiring period; and to send the list to the program state checking module 52 according to the checking period.

The program state checking module 52 is configured to check the programs whose running states are idle in the list according to the checking period.

The program list acquiring module 51 is further configured to delete essential programs in the list, wherein, the essential programs are the programs used for maintaining the normal operation and the basic functions of the terminal device.

The program list acquiring module 51 is further configured to record the running states of function programs in the list and the time information of turning the function programs to the running states, wherein, the function programs are the programs used for realizing specific application functions in the terminal device.

The program state checking module 52 is configured to determine function programs whose current running states are background suspension states in the list according to the recorded information, calculate the time difference between the time of turning the function programs to the background suspension state and a current time, and determine this time difference as a duration period; and compare the duration period with a preset duration period threshold, and determine the function programs as the programs whose running states are idle when the duration period is greater than the duration period threshold.

The program state checking module 52 is further configured to add the function programs whose running states are idle into a list of idle programs to be closed.

The prompt module 53 is configured to send the prompt information of whether to close the idle function programs when the list of idle programs to be closed is not empty.

The prompt module 53 is further configured to display names of the idle function programs in the list of idle programs to be closed when the response result of the prompt information is to close the idle function programs, to remind a user to select the idle function programs that need to be closed.

The idle program closing module 54 is configured to close the idle function programs selected by the user and release corresponding memory.

Figure 7:
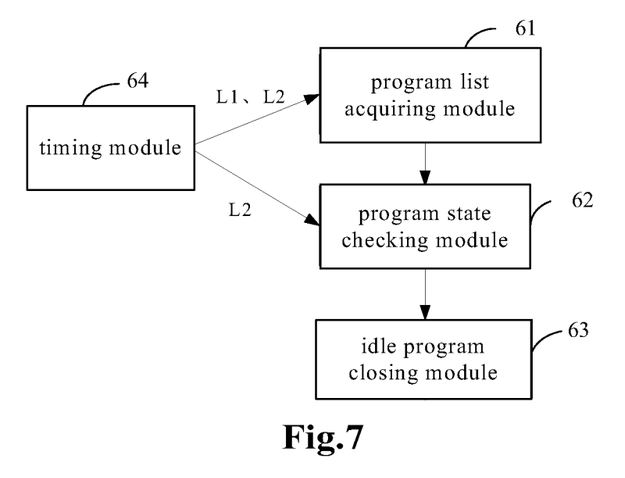
FIG. 7 is a schematic structural diagram of another terminal device according to one embodiment of the present invention.

As shown in FIG. 7, a control device (which can be a terminal device) for releasing memory is also provided by an embodiment of the present invention, and the device comprises: a program list acquiring module 61, a program state checking module 62, and an idle program closing module 63. The program list acquiring module 61 is connected with the program state checking module 62; and the program state checking module 62 is connected with the idle program closing module 63.

The program list acquiring module 61 is configured to acquire a list containing information of current running programs in a terminal device.

The program state checking module 62 is configured to check programs whose running states are idle in the current running programs.

The idle program closing module 63 is configured to close programs whose running states are idle and release corresponding memory.

The terminal device further comprises a timing module 64 which is connected with the program list acquiring module 61 and the program state checking module 62. The timing module 64 is configured to generate an acquiring period and a checking period.

The program list acquiring module 61 is configured to acquire the list containing information of all current running programs in the terminal device according to the acquiring period; and send the list to the program state checking module 62 according to the checking period.

The program state checking module 62 is configured to check programs whose running states are idle in the list according to the checking period.

The program list acquiring module 61 is further configured to delete essential programs in the list, wherein, the essential programs are the programs used for maintaining the normal operation and the basic functions of the terminal device.

The program list acquiring module 61 is further configured to record the running states of the function programs in the list and the time information of turning the function programs to the running states, wherein, the function programs are programs used for realizing specific application functions in the terminal device.

The program state checking module 62 is configured to determine function programs whose current running states are background suspension states in the list according to the recorded information, calculate the time difference between the time of turning the function programs to the background suspension state and a current time, and determine this time difference as a duration period; and compare the duration period with a preset duration period threshold, and determine the function programs as programs whose running states are idle when the duration period is greater than the duration period threshold.

The program state checking module 62 is further configured to add the function programs whose running states are idle into a list of idle programs to be closed.

The idle program closing module 63 is configured to add the function programs whose running states are idle into the list of idle programs to be closed.

The idle program closing module 63 is configured to close the idle function programs in the list of idle programs to be closed and release corresponding memory.

The work flow of the modules in the terminal device will be described as follow.

Example 1 of the work flow:

Step 1: the timing module generates an acquiring period L1 and a checking period L2, sends information of the acquiring period L1 and the checking period L2 to the program list acquiring module, and sends information of the checking period L2 to the program state checking module, wherein L1<L2.

The acquiring period L1 should be shorter than the checking period L2, to ensure acquiring the latest list of current running programs when the checking period is due.

Step 2: the program list acquiring module receives the information of the acquiring period L1 and the checking period L2 from the timing module.

When the acquiring period L1 is due, the list containing information of current running programs in the terminal device is acquired, the essential programs are removed from the list and only the function programs are kept, related information of the running state of each function program is recorded, and the old information is overlapped by the new information.

When the checking period L2 is due, the list is sent to the program state checking module.

Meanwhile, if the program list acquiring module finds new function programs that are running, the program list acquiring module adds the new function programs into the list of running programs and records the related information of their running states; and if the program list acquiring module finds one or some programs that did not run any more, the program list acquiring module deletes the one or some programs from the list of running programs.

Step 3: the program state checking module receives the information of the checking period L2 from the timing module and the list from the program list acquiring module.

When the checking period L2 is due, the running states of the function programs in the received list are checked. When there is a function program whose running state is the background suspension, the time difference between the time of turning the state of the function program to the background suspension and a current time is calculated according to the recorded information, and the time difference is used as a duration period $\Delta T$. The obtained duration period $\Delta T$ is compared with a preset duration period threshold T. If it is greater than or equal to the duration period threshold T, the running state of the function program is set as idle, the information of the function program is added into the list of idle programs to be closed, and the list of idle programs to be closed is sent to the prompt module.

Step 4: the prompt module receives the list of idle programs to be closed from the program state checking module, and when the list of idle programs to be closed is not empty, a user is reminded by a picture and/or ring that idle programs that may be closed have been detected and names of the idle function programs are displayed. The user decides to close all or part of the idle function programs according to the prompt information, and the prompt module sends the user response result of the prompt information to the idle program closing module.

Step 5: the idle program closing module receives the user response result of the prompt information from the prompt module, then closes corresponding idle function programs according to the response result and releases corresponding memory space, and notifies the prompt module to remind the user that this operation has been completed.

Example 2 of the work flow:

Step 1: the timing module generates an acquiring period L1 and a checking period L2; sends information of the acquiring period L1 and the checking period L2 to the program list acquiring module, and sends information of the checking period L2 to the program state checking module, wherein L1<L2.

The acquiring period L1 should be shorter than the checking period L2, to ensure acquiring the latest list of current running programs when the checking period is due.

Step 2: the program list acquiring module receives the information of the acquiring period L1 and the checking period L2 from the timing module.

When the acquiring period L1 is due, the list containing information of current running programs in the terminal device is acquired; the essential programs are removed from the list and only the function programs are kept, and related information of the running state of each function program is recorded, and the old information is overlapped by the new information.

When the checking period L2 is due, the list is sent to the program state checking module.

Meanwhile, if the program list acquiring module finds new function programs that are running, the program list acquiring module adds the new function programs into the list of running programs and records the related information of their running states; and if the program list acquiring module finds one or some programs that did not run any more, the program list acquiring module deletes the one or some programs from the list of running programs.

Step 3: the program state checking module receives the information of the checking period L2 from the timing module and the list from the program list acquiring module;

When the checking period L2 is due, the running states of the function programs in the received list are checked. When there is a function program whose running state is the background suspension, the time difference between the time of turning the state of the function program to the background suspension and a current time is calculated according to the recorded information, and the time difference is used as a duration period $\Delta T$. The obtained duration period $\Delta T$ is compared with a preset duration period threshold T. If it is greater than or equal to the duration period threshold T, the running state of the function program is set as idle; and the list is sent to the prompt module.

Step 4: the prompt module receives the list from the program state checking module, and when the list contains a program which running state is idle, a user is reminded by a picture and/or ring that idle programs that may be closed have been detected, and names of the programs whose running states are idle in the list are displayed. The user decides to close all or part of the idle function programs according to the prompt information, and the prompt module sends the user response result of the prompt information to the idle program closing module.

Step 5: the idle program closing module receives the user response result of the prompt information from the prompt module, then closes corresponding idle function programs according to the response result and releases corresponding memory space, and notifies the prompt module to remind the user that this operation has been completed.

It needs to be indicated that the terminal device in the embodiments of the present invention can be a mobile phone, a PDA, and etc.

To sum up, the beneficial effects of the present invention are as follows.

In the solutions provided by the embodiments of the present invention, the current running programs of the terminal device can be checked in real-time and the function programs whose states are idle can be judged, and then the list of the idle function programs can be provided to the user. The user may decide to close all or part of the function programs according to actual situations. By way of closing the idle programs, the memory can be released at any time, power consumption can be lowered, and the program response speed of the terminal device can be improved.

The solutions provided by the embodiments of the present invention support the user to view the occupation of the memory, the process list and etc., and thereby the user can timely get to know the running states of the terminal device.

Those skilled in the art shall understand that the embodiments of the present invention may be provided as method, system or computer program product. Thus, the present invention may use embodiments in the form of complete hardware embodiment, complete software embodiment, or embodiment combining software and hardware. Besides, the present invention may use product in the form of a computer program product which is implemented in one or more computer useable storage mediums (comprising, but not limited to, magnetic disc storage, CD-ROM and optical memory) comprising computer useable program code.

The present invention is described according to the flow charts and/or the block diagrams of the method, device (system) and computer program product in the embodiments of the present invention. It shall be understood that computer program instructions can be used to realize each flow and/or block of the flow charts and/or the block diagrams, and combination of flows and/or blocks of the flow charts and/or the block diagrams. Such computer program instructions may be provided to the processor of a general computer, a dedicated computer, an embedded processor or other programmable data process devices to generate a machine, so that the instructions executed by the processor of the computers or other programmable data process devices generates a device for realizing functions designated in one or more flows of the flow charts and/or one or more blocks of the block diagrams.

Such computer program instructions can also be stored in computer readable memories that can guide computers or other programmable data process devices to work in a specific manner, so that the instructions stored in the computer readable memories generate a product comprising an instruction device, wherein the instruction device is used for realizing functions designated in one or more flows of the flow charts and/or one or more blocks of the block diagrams.

Such computer program instructions can also be installed in a computer or other programmable data processing devices, so that a series of operation steps are executed in the computer or the other programmable devices to generate the process realized by the computer, and thereby the instructions executed in the computer or other programmable devices provide steps for realizing functions designated in one or more flows of the flow charts and/or one or more blocks of the block diagrams.

Although preferable embodiments of the present invention have been described above, those skilled in the art can make additional variations and modifications to such embodiments once having knowledge of basic inventive concepts. Thus, the attached claims are intended to contain the preferable embodiments and all variations and modifications falling within the scope of the present invention.

Obviously, those skilled in the art can make various changes and variations without departing from the spirit and scope of the present invention. In this case, if such amendments and changes of the present invention also fall within the claims of the present invention and equivalent technologies thereof, the present invention shall also contain such variations and changes.

What is claimed is:

1. A control method implemented by a control device for releasing memory, comprising:

obtaining information of current running programs in a terminal device;

checking programs whose running states are idle in the current running programs according to the obtained information; and closing the programs whose running states are idle and releasing corresponding memory, wherein after the checking the programs whose running states are idle in the current running programs according to the obtained information and before the closing the programs whose running states are idle, the method further comprises sending prompt information of whether to close the programs whose running states are idle, wherein the closing the programs whose running states are idle comprises closing corresponding programs according to an obtained response result of the prompt information; and wherein after the checking the programs whose running states are idle in the current running programs according to the obtained information and before the sending the prompt information of whether to close the programs whose running states are idle, the method further comprises adding the information of the function programs whose running states are idle into a list of idle programs to be closed, wherein the sending the prompt information of whether to close the programs whose running states are idle comprises sending the prompt information of whether to close the idle function programs when the list of idle programs to be closed is not empty.

2. The method according to claim 1, wherein, after obtaining the information of the current running programs in the terminal device and before checking the programs whose running states are idle in the current running programs according to the in obtained formation, the method further comprises:

deleting information of essential programs from the information of the current running programs, wherein the essential programs are programs used for maintaining normal operation and basic functions of the terminal device.

3. The method according to claim 2, wherein, after obtaining the information of the current running programs in the terminal device and before checking programs whose running states are idle in the current running programs according to the obtained information, the method further comprises: recording running states of function programs in the current running programs and time information of turning the function programs to the running states, wherein the function programs are programs used for realizing specific application functions in the terminal device; and checking the programs whose running states are idle in the current running programs according to the obtained information comprises: determining function programs whose current running states are background suspension states in the current running programs according to the recorded information, calculating a time difference between a time of turning the function programs to the background suspension state and a current time, and determining this time difference as a duration period; comparing the duration period with a preset duration period threshold, and determining the function programs as the programs whose running states are idle when the duration period is greater than the duration period threshold.

4. The method according to claim 1, wherein, after obtaining the information of the current running programs in the terminal device and before checking programs whose running states are idle in the current running programs according to the obtained information, the method further comprises: recording running states of function programs in the current running programs and time information of turning the function programs to the running states, wherein the function programs are programs used for realizing specific application functions in the terminal device; and checking the programs whose running states are idle in the current running programs according to the obtained information comprises: determining function programs whose current running states are background suspension states in the current running programs according to the recorded information, calculating a time difference between a time of turning the function programs to the background suspension state and a current time, and determining this time difference as a duration period; comparing the duration period with a preset duration period threshold, and determining the function programs as the programs whose running states are idle when the duration period is greater than the duration period threshold.

5. The method according to claim 1, wherein, after sending the prompt information of whether to close the programs whose running states are idle and before closing corresponding programs according to the obtained response result of the prompt information and releasing corresponding memory, the method further comprises: when the response result of the prompt information is to close the idle function programs, displaying names of the idle function programs in the list of idle programs to be closed to remind a user to select idle function programs that need to be closed; and closing the corresponding programs according to the obtained response result of the prompt information and releasing the corresponding memory comprises: closing the idle function programs selected by the user and releasing the corresponding memory.

6. The method according to claim 1, wherein, obtaining the information of the current running programs in the terminal device comprises: obtaining information of all current running programs in the terminal device according to a preset acquiring period after the terminal device is started up; and checking the programs whose running states are idle in the current running programs according to the obtained information comprises: checking the programs whose running states are idle in the current running programs according to a preset checking period after the terminal device is started up.

7. The method according to claim 6, wherein the checking period is greater than the acquiring period.

8. The method according to claim 1, wherein, after obtaining the information of the current running programs in the terminal device and before checking programs whose running states are idle in the current running programs according to the obtained information, the method further comprises: recording running states of function programs in the current running programs and time information of turning the function programs to the running states, wherein the function programs are programs used for realizing specific application functions in the terminal device; and checking the programs whose running states are idle in the current running programs according to the obtained information comprises: determining function programs whose current running states are background suspension states in the current running programs according to the recorded information, calculating a time difference between a time of turning the function programs to the background suspension state and a current time, and determining this time difference as a duration period; comparing the duration period with a preset duration period threshold, and determining the function programs as the programs whose running states are idle when the duration period is greater than the duration period threshold.

9. A control device for releasing memory, comprising:
a memory storing a program list acquiring module, a program state checking module, an idle program closing module and a prompt module; and
a hardware processor that upon executing said modules causes:
the program list acquiring module to obtain information of current running programs in a terminal device;
the program state checking module to check programs whose running states are idle in the current running programs according to the obtained information;
the idle program closing module to close the programs whose running states are idle and release corresponding memory;
the prompt module to send prompt information of whether to close the programs whose running states are idle after the program state checking module has checked the programs whose running states are idle in the current running programs according to the obtained information and before the idle program closing module closes the programs whose running state are idle;
the idle program closing module to close corresponding programs according to an obtained response result of the prompt information and release corresponding memory;
the program state checking module to further add the function programs whose running states are idle into a list of idle programs to be closed; and
the prompt module to send the prompt information of whether to close the idle function programs when the list of idle programs to be closed is not empty.

10. The device according to claim 9, wherein the memory further stores a timing module; and the hardware processor further causes:
the timing module to generate an acquiring period and a checking period;
the program list acquiring module to acquire information of all current running programs in the terminal device according to the acquiring period and to send the current running programs to the program state checking module according to the checking period; and
the program state checking module to check the programs whose running states are idle in the current running programs according to the checking period.

11. The device according to claim 10, wherein, the hardware processor further causes:
the program list acquiring module to: record running states of the function programs in the current running programs and time information of turning the function programs to the running states, wherein the function programs are programs used for realizing specific application functions in the terminal device; and
the program state checking module to: determine function programs whose current running states are background suspension states in the current running programs according to the recorded information, calculate a time difference between a time of turning the function programs to the background suspension state and a current time, and determine the time difference as a duration period; and compare the duration period with a preset duration period threshold, and determine the function programs as the programs whose running states are idle when the duration period is greater than the duration period threshold.

12. The device according to claim 9, wherein the hardware processor further causes the program list acquiring module to:
delete essential programs in the current running programs, wherein the essential programs maintains normal operation and basic functions of the terminal device.

13. The device according to claim 9, wherein, the hardware processor further causes:
the program list acquiring module to: record running states of the function programs in the current running programs and time information of turning the function programs to the running states, wherein the function programs are programs used for realizing specific application functions in the terminal device; and
the program state checking module to: determine function programs whose current running states are background suspension states in the current running programs according to the recorded information, calculate a time difference between a time of turning the function programs to the background suspension state and a current time, and determine the time difference as a duration period; and compare the duration period with a preset duration period threshold, and determine the function programs as the programs whose running states are idle when the duration period is greater than the duration period threshold.

14. The device according to claim 9, wherein, the hardware processor further causes:
the prompt module to display names of the idle function programs in the list of idle programs to be closed when the response result of the prompt information is to close the idle function programs, to remind a user to select idle function programs that need to be closed; and
the idle program closing module to close the idle function programs selected by the user and release the corresponding memory.

15. The device according to claim 9, wherein, the hardware processor further causes:
the program list acquiring module to: record running states of the function programs in the current running programs and time information of turning the function programs to the running states, wherein the function programs are programs used for realizing specific application functions in the terminal device; and
the program state checking module to: determine function programs whose current running states are background suspension states in the current running programs according to the recorded information, calculate a time difference between a time of turning the function programs to the background suspension state and a current time, and determine the time difference as a duration period; and compare the duration period with a preset duration period threshold, and determine the function programs as the programs whose running states are idle when the duration period is greater than the duration period threshold.

* * * * *